United States Patent
Wang et al.

(10) Patent No.: US 11,885,310 B2
(45) Date of Patent: Jan. 30, 2024

(54) COOLING SYSTEM AND WIND POWER GENERATOR SET

(71) Applicant: Xinjiang Goldwind Science & Technology Co., Ltd., Urumqi (CN)

(72) Inventors: Dinghui Wang, Beijing (CN); Jinmeng Li, Beijing (CN); Junwei Liu, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 0 days.

(21) Appl. No.: 17/997,822

(22) PCT Filed: Sep. 8, 2020

(86) PCT No.: PCT/CN2020/114011
§ 371 (c)(1),
(2) Date: Nov. 2, 2022

(87) PCT Pub. No.: WO2021/248716
PCT Pub. Date: Dec. 16, 2021

(65) Prior Publication Data
US 2023/0160372 A1    May 25, 2023

(30) Foreign Application Priority Data

Jun. 9, 2020 (CN) .......................... 202010516366.X (51) Int. Cl.
*F03D 80/60* (2016.01)
*F01P 7/16* (2006.01)
(Continued)

(52) U.S. Cl.
CPC .............. *F03D 80/60* (2016.05); *F01P 7/165* (2013.01); *F16C 37/00* (2013.01); *H02K 9/19* (2013.01); *F05B 2260/232* (2013.01)

(58) Field of Classification Search
CPC ..... F03D 80/60; F01P 2003/185; F01P 7/165; F16C 37/00; H02K 9/19
See application file for complete search history.

(56) References Cited

U.S. PATENT DOCUMENTS 9,127,648 B2 * 9/2015 Sabhapathy ............ F03D 80/80
2013/0056989 A1   3/2013 Sabhapathy
(Continued)

FOREIGN PATENT DOCUMENTS

CL    202203356 A1    5/2023
CL    202203357 A1    5/2023
(Continued)

OTHER PUBLICATIONS

Wang Dinghui, CN106939877 translation, 2017 (Year: 2017).*
(Continued)

*Primary Examiner* — Topaz L. Elliott
*Assistant Examiner* — Michael K. Reitz
(74) *Attorney, Agent, or Firm* — Bayes PLLC (57) ABSTRACT

A cooling system and a wind power generating set. The cooling system comprises two cooling sub-systems thermally coupled to each other. Each cooling sub-system comprises: a first cooling circuit for cooling a first heat-generating component, a second cooling circuit for cooling a second heat-generating component, a third cooling circuit for cooling a third heat-generating component, a fourth cooling circuit for cooling a fourth heat-generating component, a pump station unit and a heat dissipation unit. The first cooling circuit and the fourth cooling circuit are connected in parallel to form a first branch, the second cooling circuit and the third cooling circuit are connected in parallel to form a second branch, and the first branch and the second branch are connected in parallel, and are connected to the pump station unit and the heat dissipation unit. The cooling system
(Continued)

may achieve the fault-tolerant operation of two cooling sub-systems.

20 Claims, 7 Drawing Sheets

(51) Int. Cl.
*F16C 37/00* (2006.01)
*H02K 9/19* (2006.01)

(56) References Cited

U.S. PATENT DOCUMENTS

| | | | |
|---|---|---|---|
| 2013/0319631 A1 | 12/2013 | Sabhapathy et al. | |
| 2018/0213684 A1* | 7/2018 | Bailey | F25B 49/022 |
| 2020/0198440 A1* | 6/2020 | Straub | H05K 7/20254 |

FOREIGN PATENT DOCUMENTS

| | | | | |
|---|---|---|---|---|
| CN | 100523493 | C | 8/2009 | |
| CN | 201957389 | U | 8/2011 | |
| CN | 202215442 | U | 5/2012 | |
| CN | 102158014 | B | 10/2012 | |
| CN | 103696910 | A | 4/2014 | |
| CN | 101761453 | B | 8/2014 | |
| CN | 204179833 | U | 2/2015 | |
| CN | 104457394 | A | 3/2015 | |
| CN | 102192107 | B | 7/2015 | |
| CN | 103061993 | B | 9/2015 | |
| CN | 104956075 | A | 9/2015 | |
| CN | 205876628 | U | 1/2017 | |
| CN | 106939877 | A | 7/2017 | |
| CN | 206707945 | U | 12/2017 | |
| CN | 206785568 | U | 12/2017 | |
| CN | 107542629 | A | 1/2018 | |
| CN | 108955081 | A | 12/2018 | |
| CN | 109441740 | A | 3/2019 | |
| CN | 110213932 | A | 9/2019 | |
| CN | 110671282 | A | 1/2020 | |
| CN | 110725779 | A | 1/2020 | |
| EP | 2578879 | B1 | 10/2014 | |
| EP | 2803855 | A1 | 11/2014 | |
| JP | 2004360460 | | * 12/2004 | F01P 7/16 |

OTHER PUBLICATIONS

Yukio Kawasaki, JP2004360460 translation, 2004 (Year: 2004).*
International Search Report and Written Opinion in related PCT Application No. PCT/CN2020/114011, dated Mar. 10, 2021 (12 pages).
First Office Action in related Chinese Application No. 202010516366. X, dated Aug. 3, 2022 (22 pages).
Extended European Search Report in related European Application No. 20940343.5 dated Aug. 28, 2023 (7 pages).
Office Action in related Chinese Application No. 202010516571.6 dated Aug. 24, 2023 (9 pages).
Extended European Search Report in related European Application No. 20939641.5 dated Aug. 28, 2023 (9 pages).
International Preliminary Report on Patentability in related PCT Application No. PCT/CN2020/113947 dated Mar. 12, 2021 (4 pages).
Search Report in related Chilean Application No. 202203278 dated Jun. 1, 2023 (15 pages).

* cited by examiner

COOLING SYSTEM AND WIND POWER GENERATOR SET

CROSS-REFERENCE TO RELATED APPLICATIONS

The present disclosure is a national stage of International Application No. PCT/CN2020/114011, filed on Sep. 8, 2020, which claims the priority to Chinese Patent Application No. 202010516366.X, filed on Jun. 9, 2020. The entire contents of each of the above-identified applications are expressly incorporated herein by reference.

TECHNICAL FIELD

The present disclosure relates to the technical field of wind power generation, and in particular, to a cooling system and a wind power generator set.

BACKGROUND

In recent years, a wind power generator set has gradually developed towards high power density, a loss of the set itself has increased accordingly, and the number of components that need to be cooled has also increased. A generators, a shaft system, a pitch mechanism, a nacelle cabinet, a nacelle, a converter cabinet, a transformer and other heating components need to undergo necessary heat dissipation and cooling treatment to achieve a normal operation of each heating component. Especially for an offshore wind power generator set, components are arranged in an E-TOP structure of the nacelle, resulting in more and more complex arrangement and layout of the overall cooling system of the set in the nacelle. Therefore, it is necessary to design a more compact cooling system structural layout in a limited space of the nacelle, and an integrated cooling system design becomes an important research direction.

SUMMARY

An object of the present disclosure is to provide a cooling system and a wind power generator set. The cooling system can realize fault-tolerant operation of two cooling subsystems, and reduce a failure rate of the system.

In an aspect, the present disclosure provides a cooling system, comprising two cooling subsystems thermally coupled to each other, wherein each of the cooling subsystems comprises: a first cooling circuit for cooling a first heating component, a second cooling circuit for cooling a second heating component, a third cooling circuit for cooling a third heating component, a fourth cooling circuit for cooling a fourth heating component, a pump station unit and a heat dissipation unit; the first cooling circuit and the fourth cooling circuit are connected in parallel to form a first branch, the second cooling circuit and the third cooling circuit are connected in parallel to form a second branch, and the first branch and the second branch are connected in parallel and are connected with the pump station unit and the heat dissipation unit.

In another aspect, the present disclosure provides wind power generator set, comprising: a first heating component comprising at least one of a bearing and a pitch mechanism; a second heating component comprising at least one of a nacelle and a nacelle cabinet; a third heating component comprising at least one of a converter and a transformer; a fourth heat generating component comprising a generator; and the above-mentioned cooling system.

In the cooling system and the wind power generator set provided by the present disclosure, the entire machine cooling is integrated into two cooling subsystems thermally coupled to each other, so as to realize a function of fault-tolerant operation. Even if one of the cooling subsystems fails completely, the other cooling subsystem can still meet a cooling requirement of more than 75% of a capacity of the set. Each cooling subsystem integrates the first cooling circuit, the second cooling circuit, the third cooling circuit and the fourth cooling circuit corresponding to the heating components into one system, and uses the pump station unit as a core power unit that powers each cooling subsystem. After a loss of each heating component is exchanged with the cooling circuit, a direct circuit is set and a circulatory setting into a heat dissipation unit is performed, which simplifies a line configuration, reduces the number of heating components, and improves the utilization of the cooling capacity of the system without causing a great impact on a rise of a temperature of the cooling medium in the entire system. It can realize fault-tolerant operation of multiple systems while meeting the cooling requirements, and reduce the failure rate of the system.

BRIEF DESCRIPTION OF DRAWINGS

The present disclosure can be better understood from the following description of specific embodiments of the present disclosure in conjunction with accompanying drawings. Other features, objects and advantages of the present disclosure will become apparent by the following detailed description of non-limiting embodiments with reference to the accompanying drawings. The same or similar reference numbers refer to the same or similar features.

DESCRIPTION OF REFERENCE NUMBERS

First heating component 100; Second heating component 200; Third heating component 300; Fourth heating component 400; Cooling subsystem 5;

First cooling circuit 1; First fluid branch 11a; First water supply pipe 11; First water return pipe 12; First branch radiator 111; First water return pipe 12; First branch regulating valve VV1; First branch temperature sensor TT1; First branch flow sensor FF1; First valve V1; First drain valve LV1; First pressure monitoring device P1; First exhaust valve AV1;

Second cooling circuit 2; Second water supply pipe 21; Second water return pipe 22; Second radiator 23; Second flow sensor FF2; Second temperature sensor TT2; Second regulating valve VV2; Second valve V2; Second drain valve LV2; Second exhaust valve AV2; Second pressure monitoring device P2;

Third cooling circuit 3; Third water supply pipe 31; Third water return pipe 32; Valve block unit 33; Heater H; Third fluid branch 331; Third branch radiator 332; Third branch regulating valve VV3; Third branch flow sensor FF3; Third branch temperature sensor TT3; Additional temperature sensor TTE; Third valve V3; Third drain valve LV3; Third exhaust valve AV3; Third pressure monitoring device P3;

Fourth cooling circuit 4; Fourth water supply pipe 41; Fourth water return pipe 42; Fourth fluid branch 431; Fourth radiator 432; Fourth regulating valve VV4; Fourth temperature sensor TT4; Fourth flow sensor FF4; Fourth valve V4; Fourth drain valve LV4; Fourth exhaust valve AV4; Fourth pressure monitoring device P4; Two-way shut-off valve DV;

Pump station unit 5; Pump group 53; Main water supply pipe 54; First main water supply pipe 511; Second main water supply pipe 512; Main water return pipe 55; Pump body Pu; Pump body regulating valve PV; Check valve SV; Pressure stabilizing device SP; Pump body exhaust valve AV; Filter Fi; Safety device SF; Main flow sensor FF; Main temperature sensor TT; Main pressure monitoring device P; Main valve V; Drain valve LV;

Heat dissipation unit 6; Heat dissipation branch 6a; Fifth radiator 63; Fifth water supply pipe 61; Fifth temperature sensor TT5; Fifth water return pipe 62; Fifth drain valve LV5; Fifth exhaust valve AV5.

DETAILED DESCRIPTION

Features and exemplary embodiments of various aspects of the present disclosure are described in detail below. Numerous specific details are disclosed in the following detailed description to provide a thorough understanding of the present disclosure. However, it will be apparent to those skilled in the art that the present disclosure may be practiced without some of these specific details. The following description of embodiments is merely to provide a better understanding of the present disclosure by illustrating examples of the present disclosure. The present disclosure is in no way limited to any specific configurations and algorithms set forth below, but covers any modifications, substitutions and improvements of elements, components and algorithms without departing from the spirit of the present disclosure. In the drawings and the following description, well-known structures and techniques have not been shown in order to avoid unnecessarily obscuring the present disclosure.

With a rapid development of wind power generator set, a single-unit capacity of the set is increasing. On the one hand, a loss of the set itself increases, and on the other hand, the number of components that need to be cooled also increases. Especially with a development of a large-capacity offshore set, the E-TOP layout structure (generator, shaft system, pitch mechanism, nacelle cabinet, converter cabinet, transformer and other heating components are all arranged in the nacelle) has an advantage of significantly improving the overall performance relative to environmental factors at sea. But when these heating components are arranged in the nacelle, they all require independent heat dissipation and cooling treatment, and all cooling subsystems are arranged in the nacelle, resulting in more and more components in the nacelle and an increasingly complex layout. In view of different control strategies, processes and layout positions of each heating component, a fault-tolerant control logic of each cooling subsystem is complicated, which leads to an increase in a failure rate of the system. The overall layout and structure of the cooling subsystem of each heating component are optimized. And a fault-tolerant dual cooling system is set up to improve a maintenance-free performance of large-capacity offshore units.

The present disclosure aims to construct an integrated dual-system centralized fault-tolerant cooling system for wind power generator set, which is especially suitable for offshore high-power permanent magnet direct-drive wind power generator set. For the set with no E-TOP layout (that is, the main heating components are not all located in the nacelle), if a length cost and a layout complexity of a line are not considered, the centralized cooling system of the present disclosure can also be used. That is, according to an actual position of respective heating components, the same layout idea can be adopted to lay out respective cooling subsystems, thereby optimizing the layout of the cooling subsystems of the heating components as a whole. For a better understanding of the present disclosure, the cooling system and the wind power generator set according to embodiments of the present disclosure will be described in detail below with reference to FIGS. 1 to 10.

Figure 1:
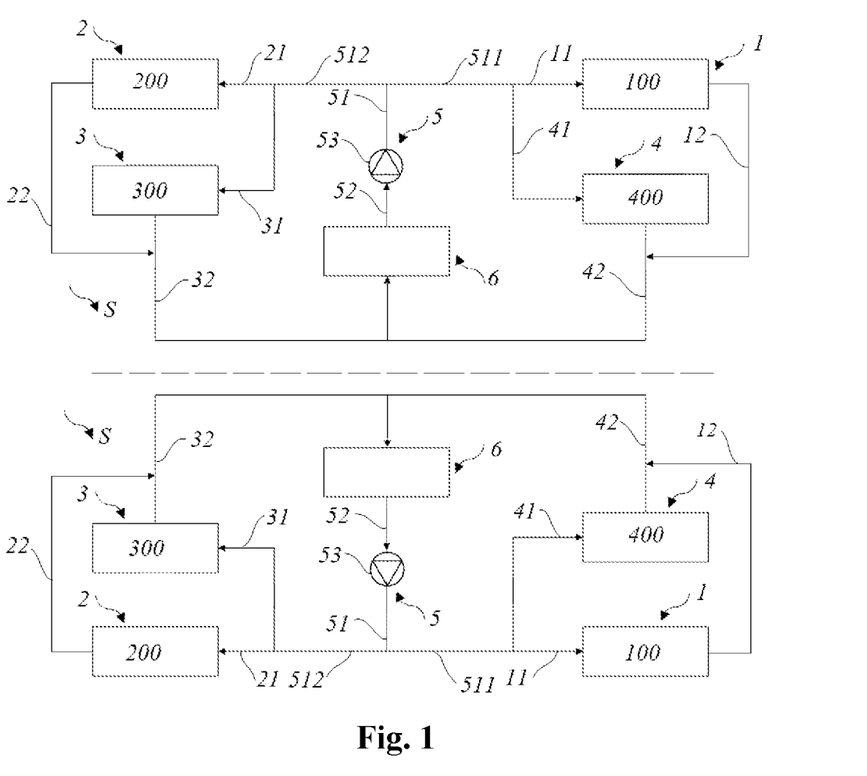
FIG. 1 is a simplified schematic structural diagram of a cooling system for a wind power generator set provided by an embodiment of the present disclosure.

Referring to FIG. 1, an embodiment of the present application provides a wind power generator set, including: a first heating component 100, a second heating component 200, a third heating component 300, a fourth heating component 400, and a cooling system. The cooling system is used to cool the heating components.

The first heating component 100 is a combination of components that generate a less amount of heat, and its heat dissipation loss is also less. Optionally, the first heating component 100 includes at least one of a bearing and a pitch mechanism. Due to a similar position arrangement of the bearing and the pitch mechanism, a heat dissipation subsystem of each heating component can be combined into one cooling circuit or several parallel cooling branches in an integrated manner to meet heat-dissipation requirement of each heating component.

The second heating component 200 is a combination of components that generate a less amount of heat, and its heat dissipation loss is also less. Optionally, the second heating component 200 includes at least one of a nacelle and a nacelle cabinet. The nacelle and the nacelle cabinet have similar cooling principles as the bearing and the pitch mechanism. According to different position arrangements of the heating components, different forms of cooling circuits are provided.

The third heating component 300 is a combination of components that generate a relatively large amount of heat. Optionally, the third heating component 300 includes at least one of a converter and a transformer. The heat dissipation losses of both the converter and the transformer are relatively large, and the heat dissipation of each third heating component 300 can be integrated into one cooling circuit or multiple parallel cooling branches in an integrated manner to meet a heat-dissipation requirement of each third heating component 300.

The fourth heating component 400 is a combination of components that generate the largest amount of heat. Optionally, the fourth heating component 400 includes a generator. The heat dissipation loss of the fourth heating component 400 is the largest, the cooling capacity requirement thereof is the largest, and an increase or decrease of the heat-dissipation loss of the third heating component 300 is proportional to the heat-dissipation loss of the fourth heating component 400 taking the generator as an example, that is, they operate in opposite directions.

It should be noted that the cooling combination and form of the cooling circuit of the above-mentioned transformer, converter, bearing, pitch mechanism, generator, nacelle and other heating components can be combined and arranged according to the actual heat-dissipation amount of each heating component and the layout of the actual nacelle. The above-mentioned integration of transformer and converter into one cooling circuit or multiple cooling branches, and the integration of bearing and pitch into one cooling circuit or multiple cooling branches are only an example of the combination. In actual operation and design, in order to achieve a purposes and requirement of line layout aesthetics and optimal capacity, corresponding combinations or similar settings can be flexibly carried out according to different nacelle layouts.

For the convenience of description, an embodiment of the present disclosure provides the first cooling circuit 1 (i.e., a bearing and the pitch cooling system) for cooling the first heating component 100, and the second cooling circuit 2 (i.e., a nacelle cooling system) for cooling the second heating component 200, the third cooling circuit 3 (i.e. a converter and transformer cooling system) for cooling the third heating component 300, the fourth cooling circuit 4 (i.e. a generator cooling system) for cooling the fourth heating component 400 as an example for description.

A cooling system provided by an embodiment of the present disclosure includes: two cooling subsystems S thermally coupled to each other. Each cooling subsystem S includes: the first cooling circuit 1 for cooling the first heating component 100, the second cooling circuit 2 for cooling the second heating component 200, the third cooling circuit 3 for cooling the third heating component 300, the fourth cooling circuit 4 for cooling the fourth heating component 400, a pump station unit 5 and a heat dissipation unit 6. The heat generation amount of the first heating component 100 and the second heating component 200 is the smallest, the heat generation amount of the fourth heating component 400 is the largest, and the heat generation amount of the third heating component 300 is between the heat generation amount of the first heating component 100 and the heat generation amount of the fourth heating component 400.

The first cooling circuit 1 and the fourth cooling circuit 4 are connected in parallel as a first branch, the second cooling circuit 2 and the third cooling circuit 3 are connected in parallel as a second branch, and the first branch and the second branch are connected in parallel and is connected to the pump station unit 5 and the cooling unit 6.

Further, in the two cooling subsystems S that are thermally coupled to each other, the cooling capacity provided by each cooling subsystem S when it operates alone accounts for more than 75% of the cooling capacity provided when the entire cooling system operates. Specifically, the cooling system adopts two cooling subsystems S to realize the heat dissipation of the entire wind power generator set. Due to the operation of a single cooling subsystem S, a temperature difference of the cooling medium at an inlet and outlet of the radiator is the largest, which can maximize the heat dissipation efficiency. Therefore, an operating efficiency of a single cooling subsystem S exceeds more than 50% of the operating efficiency of the two cooling subsystems S. Even after one cooling subsystem S fails, the other cooling subsystem S can fully achieve more than 75% of the heat dissipation of the unit.

In the cooling system provided by the embodiment of the present disclosure, the cooling of the whole set is integrated into two cooling subsystems S thermally coupled to each other, so as to realize a function of fault-tolerant operation. Even if one of the cooling subsystems S fails completely, the other cooling subsystem S can still meet a cooling requirement of more than 75% of a capacity of the set. Each cooling subsystem S integrates the first cooling circuit 1, the second cooling circuit 2, the third cooling circuit 3 and the fourth cooling circuit 4 corresponding to the heating components into one pump station unit 5, and uses the pump station unit 5 as a core power unit that powers each cooling subsystem S. After a loss of each heating component is exchanged with the cooling circuit, a direct circuit is set and a circulatory setting into the heat dissipation unit 6 is performed, which simplifies a line configuration, reduces the number of heating components, and improves the utilization of the cooling capacity of the system without causing a great impact on a rise of a temperature of the cooling medium in the entire system. It can realize fault-tolerant operation of multiple systems while meeting the cooling requirements, and reduce the failure rate of the system.

Referring to FIG. 1 again, the pump station unit 5 serves as the core power unit of each cooling subsystem S, and provides power for the entire cooling subsystem S. The pump station unit 5 includes a pump group 53, a main water supply pipe 51 and a main water return pipe 52, and the main water supply pipe 51 includes a first main water supply pipe 511 and a second main water supply pipe 512. The pump group 53 is used to provide cooling medium for the first cooling circuit 1, the second cooling circuit 2, the third cooling circuit 3 and the fourth cooling circuit 4. The cooling medium may be liquid medium such as water, oil, or the like.

As mentioned above, the first cooling circuit 1 and the fourth cooling circuit 4 are connected in parallel to form the first branch, and the second cooling circuit 2 and the third cooling circuit 3 are connected in parallel to form the second branch. The cooling medium enters the first main water supply pipe 511 and the second main water supply pipe 512 respectively from the pump group 53 via the main water supply pipe 51. The cooling medium enters the first branch through the first main water supply pipe 511, and the cooling medium enters the second branch through the second main water supply pipe 512, flows through the heat dissipation unit 5 and then flows back into the pump group 53 through the main water return pipe 52.

Therefore, the pump station unit 5 of each cooling subsystem S divides the main water supply pipe 51 into two branches, i.e., the first main water supply pipe 511 and the second main water supply pipe 512, to ensure the stability of the water supply of the system. The cooling medium is provided to the first cooling circuit 1 and the second cooling circuit 2 through the pump group 53 and the first main water supply pipe 511, respectively. The cooling medium is provided to the second cooling circuit 2 and the third cooling circuit 3 through the second main water supply pipe 512, respectively. The heated cooling medium flows through the cooling unit 6 and then decreases in temperature, and returns to the pump station unit 5 through the main water return pipe 52 to complete a closed-circuit cycle. According to the required cooling capacity, each cooling circuit can flow the cooling medium from the pump station unit 5 into each cooling subsystem through two parallel connections, which can reduce a repeated arrangement of parallel lines, improve the flow of cooling medium into each cooling subsystem, and reduce the system capacity.

Figure 2:
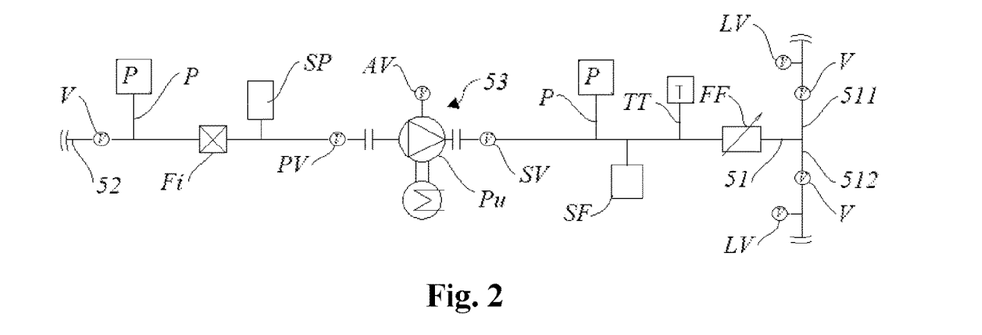
FIG. 2 is a schematic structural diagram of a pump station unit in the cooling system shown in FIG. 1.

FIG. 2 shows a specific structure of a pump station unit in the cooling system provided by the embodiment of the present disclosure. The pumping station unit 5 includes the pump group 53, various functional valves, various sensors, the pressure stabilizing device, and a safety device and a filter, so as to realize a normal, stable and maintainable operation of the entire cooling system.

In the pump station unit 5 of each cooling subsystem S, the pump group 53 includes a pump body Pu, and the cooling of the entire set is in the form of multi-system single pump group fault tolerance. In order to achieve the optimal energy efficiency of the system, the pump group 53 can adopt high and low speed control, variable frequency control or both fault-tolerant control, so as to improve the fault tolerance of the system and obtain an effective energy saving strategy.

The pump body Pu is provided with an exhaust valve AV to exhaust gas during system operation, thereby protecting the safe operation of the pump group 53. An outlet of the pump body Pu is provided with a check valve SV to protect the pump body Pu. An inlet of the pump body Pu is provided with a pump body regulating valve PV, and when a leakage problem occurs in the pump body Pu, the pump body regulating valve PV is quickly closed. A corresponding pump body Pu is cut off via the check valve SV and the pump body regulating valve PV. If the pump body Pu is in a form of a non-mechanical seal, the pump body regulating valve PV can be omitted.

Optionally, the inlet of the pump group 53 is provided with a filter Fi to ensure the cleanliness of the system. In addition, the filter Fi has a drainage function and can be used as a local drainage point for the pump group 53.

Optionally, the main water return pipe 55 is provided with a pressure stabilizing device SP, which can be used in the form of a high-level water tank or an expansion tank for the system to generate an alarm due to system pressure fluctuations due to temperature changes and to avoid harm to the system. Optionally, the outlet of the pump group 53 is provided with a safety device SF to relieve pressure to achieve protection when the system pressure exceeds a certain value. The safety device SF can be removed when the pressure stabilizing device SP adopts a high-level water tank.

Optionally, each of the inlet and outlet of the pump group 53 is also provided with a main pressure monitoring device P. Optionally, the main pressure detection device P includes a main pressure transmitter and a main pressure display device, the main pressure transmitter is used for local and remote monitoring of an operation status of the system, the main pressure display device is used for local injection and operation and maintenance observation.

Optionally, the first main water supply pipe 511, the second main water supply pipe 512 and the main water return pipe 52 are respectively provided with main valves V. Via the opening and closing of the main valves V, the cutting out of the pumping station unit 5 is realized, which facilitates the replacement and maintenance of the components and sensors on the pumping station unit 5.

Optionally, each of the first main water supply pipe 511 and the second main water supply pipe 512 is provided with a drain valve LV, which can realize the liquid drain of equipment and lines on each cooling circuit.

Optionally, the inlet of the pump group 53 is provided with a main flow sensor FF, and the outlet of the pump group 53 is provided with a main temperature sensor TT. The main temperature sensor TT is used for taking a value of an inlet temperature of each cooling circuit. Combined with the temperature sensor provided on each of the cooling circuits and the cooling unit 6 and the flow sensor provided on each cooling branch, it is convenient to calculate the actual heat dissipation loss of each cooling circuit in the logic control process. Therefore, in combination with parameters such as ambient temperature, load of the set, flow rate of the system, etc., the entire internal logic relationship of each cooling circuit and the system is recorded, which is beneficial to the optimization of system control logic and the optimization of component selection.

Figure 3:
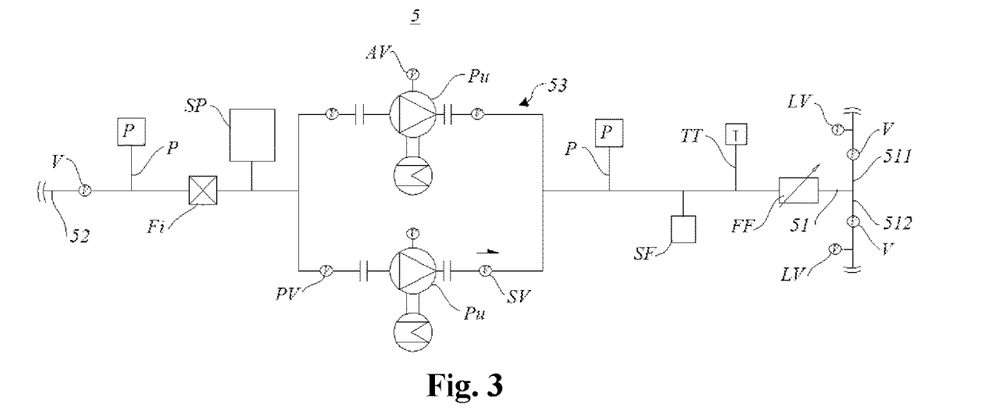
FIG. 3 is a schematic structural diagram of another pump station unit in the cooling system shown in FIG. 1.

FIG. 3 shows a schematic structural diagram of another pump station unit in the cooling system provided by an embodiment of the present disclosure. The pump station unit 5 is similar to the pump station unit 5 shown in FIG. 2, the difference is that the pump group 53 includes at least two pump bodies Pu arranged in parallel, and the cooling of the entire set is in a form of multiple systems, multiple pump groups and fault tolerance. That is, in the case of realizing multi-system fault tolerance, the fault tolerance of key components, such as multi-pump groups, can also be realized.

Each cooling subsystem S is equipped with at least two pump bodies Pu running in parallel which can also be partially operated and partially standby. Operation with energy saving and fault tolerance can be achieved after comprehensive consideration of factors such as space layout size, system capacity, reliability and cost performance. That is, after one pump body Pu fails, the remaining pump body Pu can still meet all or more than 75% of the performance of the system. At the same time, in order to further achieve the optimal energy efficiency of the system, the pump group 53 can adopt control methods such as fixed frequency operation, high and low speed operation, variable frequency operation, or a fault-tolerant operation of at least two pump bodies Pu to meet the cooling load operation requirements of the entire wind power generator set, improve the fault tolerance of the system and obtain an effective energy saving strategy.

Referring to FIG. 1 again, the first cooling circuit 1 includes a first fluid line, and a first water supply pipe 11 of the first fluid pipe is communicated with the first main water supply pipe 511.

The fourth cooling circuit 4 includes a fourth fluid line, a fourth water supply pipe 41 of the fourth fluid line is communicated with the first main water supply pipe 511, and the fourth water return pipe 42 of the fourth fluid line is communicated with the first water return pipe 12 of the first cooling circuit 1. A fourth water return pipe 42 of the fourth cooling circuit 4 is connected to the main water return pipe 52 after entering the heat dissipation unit 6.

The second cooling circuit 2 includes a second fluid line, and a second water supply pipe 21 of the second fluid line is communicated with the second main water supply pipe 512.

The third cooling circuit 3 includes a third fluid line, a third water supply pipe 31 of the third fluid line is communicated with the second main water supply pipe 512, and the third water return pipe 32 of the third fluid line is communicated with a second water return pipe 22 of the second fluid line. A third water return pipe 32 of the third cooling circuit 3 enters the heat dissipation unit 6 and is communicated with the main water return pipe 52.

The specific structure of each cooling circuit will be described in further detail below with reference to FIGS. 4 to 9.

Figure 4:
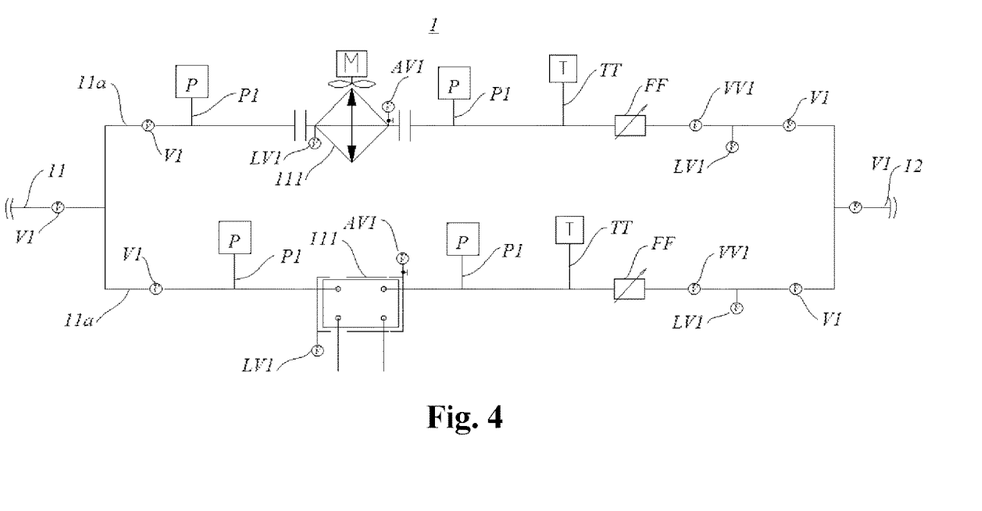
FIG. 4 is a schematic structural diagram of a first cooling circuit in the cooling system shown in FIG. 1.

FIG. 4 shows the specific structure of the first cooling circuit 1. The first cooling circuit 1 is a bearing and pitch mechanism cooling system, including a first fluid line, at least two first branch radiators 111 in parallel for cooling the at least two first heating components 100, and a variety of functional valves and various sensors to realize a normal, stable and maintainable operation of the first cooling circuit 1.

The cooling medium flows into the first water supply pipe 11 via the first main water supply pipe 511 of the pump station unit 5, is transported to at least two first branch heat exchangers 111 in parallel, after conducting heat exchange between each branch heat exchanger and each first heating component 100, converges to the first water return pipe 12, and then converges with the fourth water return pipe 42 of the fourth cooling circuit 4.

Specifically, the first fluid line of the first cooling circuit 1 includes at least two first fluid branches 11a corresponding to the at least two first heating components 100 one-to-one, and each first fluid branch 11a is provided with a first branch radiator 111, and a first branch regulating valve VV1, a first branch temperature sensor TT1 and a first branch flow sensor FF1 provided downstream of the first fluid branch 11a.

Measured values of each first branch temperature sensor TT1 and each first branch flow sensor FF1 are monitored, and according to a target temperature value of each first heating component 100, an opening of the first fluid branch 11a is controlled to adjust a flow rate of each first branch regulating valve VV1.

Optionally, the first water supply pipe 11, the first water return pipe 12, and at least one of the inlet and the outlet of each first branch radiator 111 are provided with first valves V1.

Optionally, each first fluid branch 11a and at least one of first branch radiators 111 are provided with first drain valves LV1. Optionally, each first branch radiator 111 is further provided with a first exhaust valve AV1. Optionally, the inlet and outlet of each first branch radiator 111 are respectively provided with first pressure monitoring devices P1. Optionally, the first pressure monitoring device P1 includes a pressure transmitter and a pressure display device.

In this embodiment, the first heating component 100 is, for example used as, a bearing or a pitch mechanism. The first cooling circuit 1 enters the first fluid branch 11a for cooling the bearing (such as the upper cooling branch in FIG. 4) and enters the first fluid branch 11a for cooling the pitch mechanism (such as the lower cooling branch as shown in FIG. 4) along the first water supply pipe 11 through the first main water supply pipe 511 on the pump station unit 5. Since the first fluid branch 11a for cooling the pitch mechanism is similar in principle to the first fluid branch 11a for cooling the bearing, the following takes the first fluid branch 11a for cooling the bearing as an example to properly describe the first fluid branch for cooling the pitch mechanism 11a.

The first branch radiator 111 provided on the first fluid branch 11a for cooling the bearing can be an air-water radiator and in a directly liquid cooling. The first branch radiator 111 is provided with a first exhaust valve AV1 and a first drain valve LV1 to facilitate the injection, exhaust, and discharge of the first fluid branch 11a and the first branch radiator 111. The first pressure monitoring devices P1 are respectively provided at the front and rear of the first branch radiator 111, so that the pressure of the first fluid branch 11 for cooling the bearing can be effectively monitored locally and remotely. The first fluid branch 11a is provided with a first drain valve LV1 to facilitate the discharge operation on the first fluid branch 11a.

The first fluid branch 11a is provided with a first branch temperature sensor TT1 and a first branch flow sensor FF1. Combined with the main temperature sensor TT on the pump station unit 5, an actual heat dissipation of each first fluid branch 11a can be obtained. Through data statistics and analysis, a logical relationship between the environmental boundary, load of the set, opening of electric valve and other factors can be effectively obtained, which can effectively improve the optimization of each heat dissipation component and pump group and the logic control of the unit.

At the same time, taking the temperature limit of the bearing as a control target, a first branch regulating valve VV1 is provided on the first fluid branch 11a for cooling the bearing. The variable frequency modulation of a fan on the first branch radiator 111 is controlled or the opening degree of the first branch valve VV1 is adjusted according to the target temperature value of the bearing, so as to realize the energy saving of the system under the condition of ensuring that the heat dissipation requirements are met. Similarly, the first branch radiator 111 for cooling the pitch mechanism can be an oil-water cooling radiator or other radiators, and the components and sensors provided on the first branch radiator 111 and are similar to those on the first branch radiator 111 for cooling the bearing and will not be repeated here. The first valves V1 respectively provided on the first water supply pipe 11 and the first water return pipe 12 can be opened and closed to replace and maintain the components and sensors of the entire first cooling circuit 1. The water return branches of the first liquid branches 11a respectively for cooling the bearing and cooling the pitch mechanism are collected and then enter the first water return pipe 12 and finally enter the fourth cooling circuit 4.

Figure 5:
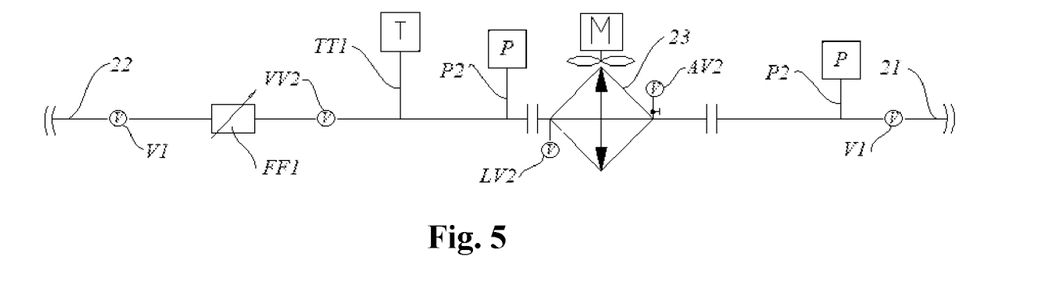
FIG. 5 is a schematic structural diagram of a second cooling circuit in the cooling system shown in FIG. 1.

FIG. 5 shows the specific structure of the second cooling circuit 2. The second cooling circuit 2 is a nacelle cooling system, which includes a second fluid line, a second radiator 23 for cooling the second heating component 200, and also includes various functional valves and various sensors to realize a normal, stable and maintainable operation of the second cooling circuit 2.

The cooling medium flows into the second water supply pipe 21 through the second main water supply pipe 512 of the pump station unit 5, is transported to the second heat exchanger 23, and after conducting heat exchange between the second heat exchanger 23 and the second heating component 200, converges to the second heat exchanger 23 and then the secondary water return pipe 22 then converges with the third water return pipe 32 of the third cooling circuit 3.

Specifically, the second fluid line of the second cooling circuit 2 is provided with a second radiator 23, and the second water return pipe 22 is provided with a second regulating valve VV2, a second temperature sensor TT2 and a second flow sensor FF2. The measured values of the second temperature sensor TT2 and the second flow sensor FF2 are monitored, and according to the target temperature value of the second heating component 200, the opening of the second regulating valve VV2 is controlled to adjust the flow rate of the second fluid line.

Optionally, the second water supply pipe 21 and the second water return pipe 22 are respectively provided with second valves V2. Optionally, the second water return pipe 22 and/or the second radiator 23 are respectively provided with second drain valves LV2. Optionally, the second radiator 23 is further provided with a second exhaust valve AV2. Optionally, the second water supply pipe 21 and the second water return pipe 22 are respectively provided with second pressure monitoring devices P2. Optionally, the second pressure monitoring device P2 includes a pressure transmitter and a pressure display device.

In this embodiment, the second heating component 200 is, for example, a nacelle. The second cooling circuit 2 enters the second radiator 23 along the second water supply pipe 21 via the second main water supply pipe 512 on the pump station unit 5. And the principle is similar to that of the first fluid branch 11a for cooling the bearing as shown in FIG. 4. The second radiator 23 can be an air-water radiator, or other radiators, which can be configured according to actual needs. The second radiator 23 is provided with a second exhaust valve AV2 and a second drain valve LV2 to facilitate an injection, exhaust, and liquid discharge of the second fluid line.

The second water return pipe 22 is provided with a second temperature sensor TT2 and a second flow sensor FF2. Combined with the main temperature sensor TT in the pump station unit 5, via data statistics and analysis, a logical relationship between the heat dissipation of the second fluid line and the environmental boundary, load of the set, system flow, etc. can be obtained. Similarly, the second pressure monitoring devices P2 are respectively provided at the front and rear of the second radiator 23, so that the pressure of the second fluid line can be effectively monitored locally and remotely, and thus a system resistance caused by the second fluid line can be known. The second water return pipe 22 is provided with a second exhaust valve AV2. By closing of the second valves V2 on the second water supply pipe 21 and the second water return pipe 22, the equipment and sensors on the second fluid line can be replaced and maintained.

Figure 6:
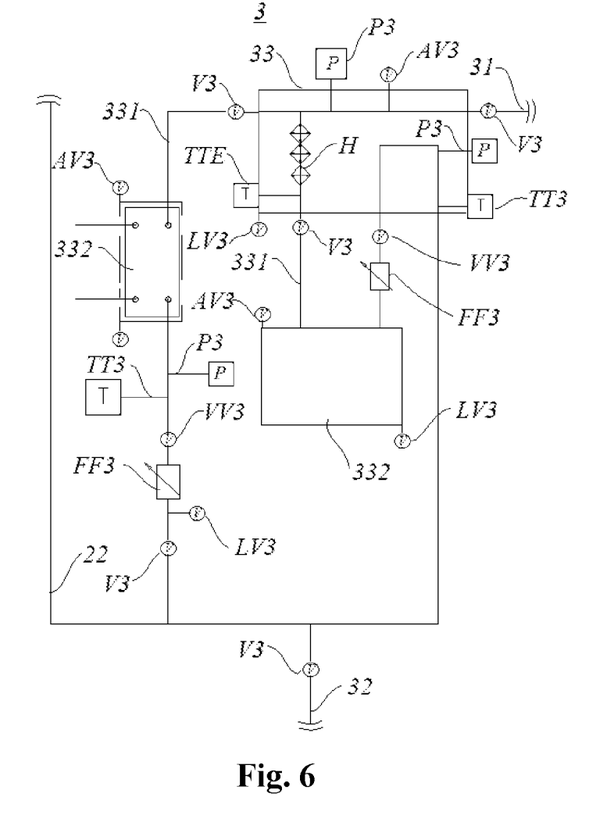
FIG. 6 is a schematic structural diagram of a third cooling circuit in the cooling system shown in FIG. 1.

FIG. 6 shows the specific structure of the third cooling circuit 3. The third cooling circuit 3 is a converter and transformer cooling system, including a third fluid line, a valve block unit 33, third branch radiators 332 for cooling respective third heating components 300, and also includes various functional valves and various sensors integrated in the valve block 33, to realize the normal, stable and maintainable operation of the third cooling circuit 3.

The cooling medium flows into the third water supply pipe 31 through the second main water supply pipe 512 of the pump station unit 5, is transported to each third branch radiator 332 via the valve block unit 33, and after conducting heat exchange between each third branch radiator 332 and the corresponding third heating components 300, converge to the third water return pipe 32, and the second water return pipe 22 of the second cooling circuit 2 also converges to the third water return pipe 32.

Specifically, the third fluid line of the third cooling circuit 3 includes at least two third fluid branches 331 corresponding to the at least two third heating components 300 one-to-one. And at least two third fluid branches 331 are integrated into the valve block unit 33. Each third fluid branch 331 is provided with a third branch radiator 332, and a third branch regulating valve VV3, a third branch temperature sensor TT3 and a third branch flow sensor FF3 located downstream of the third fluid branch 331. Measured values of the third branch temperature sensor TT3 and the third branch flow sensor FF3 are monitored, and according to a target temperature value of the third heating component 300, an opening of each third branch regulating valve VV3 is controlled to adjust a flow rate of each third fluid branch 331.

Optionally, the third water supply pipe 31 and the third water return pipe 32, the outlet of the valve block unit 33 and at least one of downstream of third fluid branches 331 are provided with third valves V3.

Optionally, at least one third fluid branch 331, the valve block unit 33 and at least one of third branch radiators 332 are provided with third drain valves LV3. Optionally, the valve block unit 33 and at least one of third branch radiators 332 are further provided with third exhaust valves AV3.

Optionally, third pressure monitoring devices P3 are provided on the valve block unit 33 and/or downstream of each of the third fluid branches 331, respectively. Optionally, the third pressure monitoring device P3 includes a pressure transmitter and a pressure display device.

In the third cooling circuit 3, the integration of sensors and the branching of at least two third fluid branches 331 are realized via the arrangement of the valve block unit 33, thereby realizing centralized design and modular design. In this embodiment, the third heating components 300, for example, a converter or a transformer, are integrated. According to the actual spatial layout, the integrated design of different third fluid branches 331 can be performed due to the system capacity and the length of the line arrangement.

Under the action of the pump station unit 5, the cooling medium enters the valve block unit 33 through the second main water supply pipe 512, and the third water supply pipe 31 in the valve block unit 33 is divided into two third fluid branches 331, which are respectively used for cooling the transformer and the converter. The outlet of the valve block unit 33 and the downstream of each third fluid branch 331 are respectively provided with third valves V3. Via the third valves V3, each third fluid branch 331 can be effectively cutting off from the valve block unit 33. A third pressure monitoring device P3 is provided on the main passage in the valve block unit 33 to remotely and locally monitor the inlet pressure of each third fluid branch 331. At the same time, the valve block unit 33 is also provided with a third exhaust valve AV3 for local automatic exhaust. A reserved pressure measuring joint (not shown in the figure) is provided on the valve block unit 33 to facilitate pressure calibration. After passing through the water supply branch of the third fluid branch 331, the cooling medium enters the third branch radiator 332. The components and sensors on the third fluid branch 331 are similar to those on the first fluid branch 11a in FIG. 4, component setting function are also similar and won't be described again.

Optionally, at least one third fluid branch 331 is provided with a heater H and an additional temperature sensor TTE integrated into the valve block unit 33. The additional temperature sensor TTE is used to measure the inlet temperature of the third fluid branch 331, and if the inlet temperature is lower than a preset temperature, the heater H is activated.

In this embodiment, the third branch regulating valve VV3 is used to remotely monitor the temperature of the cooling medium entering the third fluid branch 331 for cooling the converter, so as to ensure the minimum temperature requirement. At the same time, based on the consideration of energy saving, the power consumption of the heater H is reduced by opening the third branch regulating valve VV3.

At the same time, a third pressure monitoring device P3 is respectively disposed downstream of each third fluid branch 331, so that the resistance of each third fluid branch 331 can be monitored remotely and locally. By combining the measured values of the third branch temperature sensor TT3, the additional temperature sensor TTE and the third branch flow sensor FF3, the heat dissipation of the third fluid branch 331 for cooling the converter can be monitored in real time.

In addition, each third branch radiator 332 is also provided with a third exhaust valve AV3 and a third drain valve LV3 respectively, so as to facilitate local injection, exhaust, and liquid discharge.

The outlet of the valve block unit 33 and the downstream of each third fluid branch 331 are respectively provided with third valves V3. According to different cutting methods, the replacement and maintenance of components and sensors on each third fluid branch 331 can be effectively realized. Similarly, combined with the third branch temperature sensor TT3 and the third branch flow sensor FF3, and the main temperature sensor TT on the pump station unit 5, the heat exchange amount and heating amount of each third fluid branch 331 and an organic connection and logical relationship between the heat exchange and environmental boundary, capacity of the set, and flow rate of the system can be dynamically recorded. Finally, the water return branch of each third fluid branch 331 of the third cooling circuit 3 and the second water return pipe 22 of the second cooling circuit 2 are collectively collected into the third water return pipe 32.

Via the integrated design of the local valve block unit, operation and maintenance points can be effectively reduced, a line layout can be simplified, a centralized layout of valves and sensors can be realized, and a modular setting of the partial line diversion can also be realized.

Figure 7:
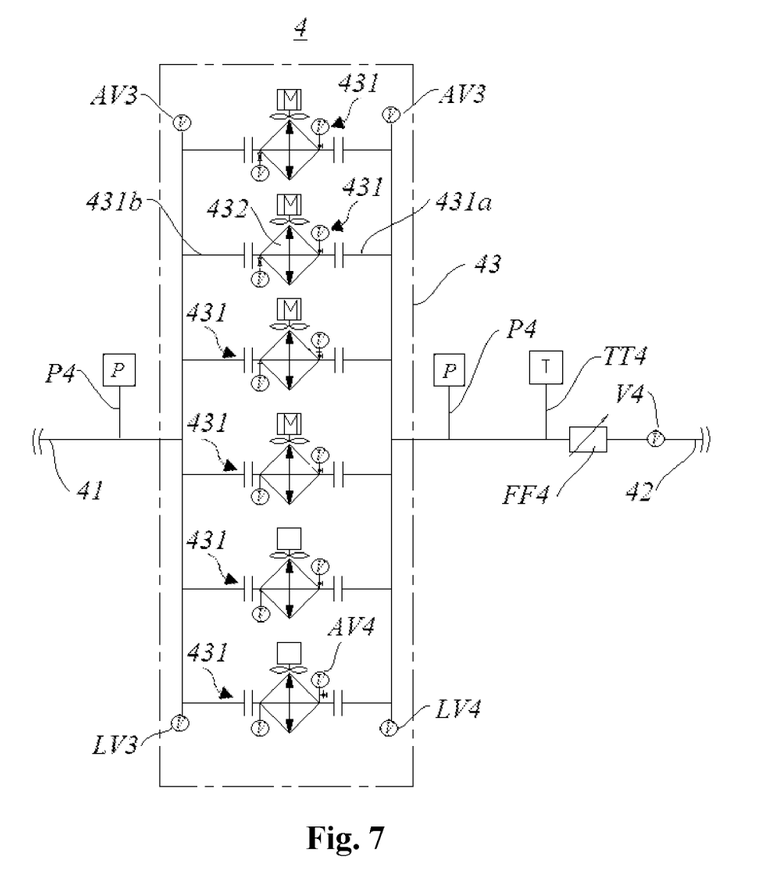
FIG. 7 is a schematic structural diagram of a fourth cooling circuit in the cooling system shown in FIG. 1.

FIG. 7 shows the specific structure of the fourth cooling circuit 4. The fourth cooling circuit 4 is a generator cooling system, including a fourth fluid line and a cooling side 43 located on a peripheral side of the fourth heating component 400. The cooling side 43 is provided with a plurality of fourth radiators 432 connected in parallel, and also includes various functional valves and various sensors to realize a normal, stable and maintainable operation of the fourth cooling circuit 4.

The cooling medium flows into the fourth water supply pipe 41 via the first main water supply pipe 511 of the pump station unit 5, is transported to each fourth radiator 432, and after conducting heat exchange between each fourth radiator 432 and the fourth heating component 300, converges to the fourth water return pipe 42. The first water return pipe 12 of the first cooling circuit 1 also converges to the fourth return pipe 42.

Specifically, the fourth fluid line of the fourth cooling circuit 4 is provided with a cooling side 43 located on the peripheral side of the fourth heating component 400, and the cooling side 43 includes a plurality of fourth fluid branches 431 arranged in parallel. A fourth radiator 432 is disposed on each fluid branch 431, and a plurality of fourth radiators 432 are evenly distributed along the peripheral direction of the cooling side.

Optionally, a fourth valve V4 is provided on the fourth water return pipe 42. Optionally, at least one of the fourth water supply pipe 41 and the fourth water return pipe 42 is provided with a fourth drain valve LV4. Optionally, the fourth water supply pipe 41, the fourth water return pipe 42 and at least one of the fourth radiators 432 are further provided with fourth exhaust valves AV4, respectively.

In this embodiment, the fourth heating component 400 is, for example, a generator as an example. The working principle of the fourth cooling circuit 4 is similar to that in FIG. 4. It enters the cooling side 43 of the fourth heating component 400 along the fourth water supply pipe 41 via the first main water supply pipe 511 on the pump station unit 5. Optionally, the fourth water supply pipe 41 and the fourth water return pipe 42 are respectively provided with fourth pressure monitoring devices P4. Optionally, the fourth pressure monitoring device P4 includes a pressure transmitter and a pressure display device. Optionally, the fourth water return pipe 42 is provided with a fourth temperature sensor TT4 and a fourth flow sensor FF4. According to a temperature difference between the fourth temperature sensor TT4 and the main temperature sensor TT and a flow rate of the fourth flow sensor FF4, an actual heat dissipation loss of the four cooling circuits 4 is obtained.

Figure 8:
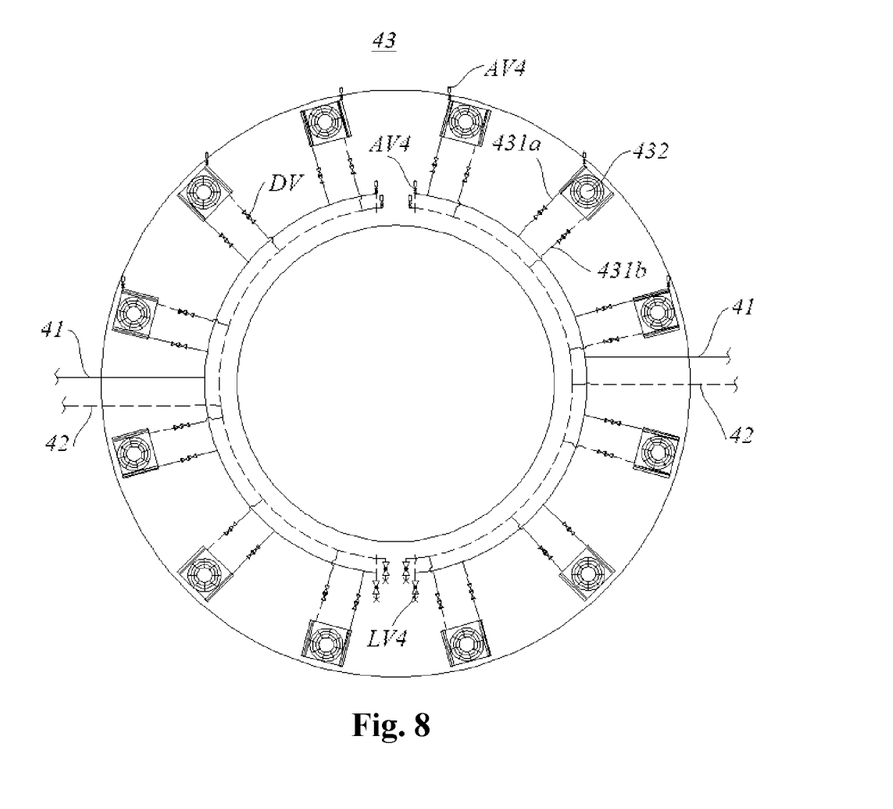
FIG. 8 is a schematic structural diagram of a cooling side in the cooling system shown in FIG. 7.

FIG. 8 shows a schematic structural diagram of a cooling side of the fourth cooling circuit. The fourth water supply pipes 41 and the fourth water return pipes 42 of the at least two cooling subsystems S are arranged side by side with respect to each of the fourth radiators 432 in the cooling side 43.

In this embodiment, taking the fourth cooling circuit 4 including two cooling subsystems on the cooling side 43 as an example, and the cooling medium enters the cooling side 43 via the two fourth water supply pipes 41, respectively. The fourth water supply pipe 41 and the fourth water return pipe 42 are connected in a completely symmetrical manner with respect to each fourth radiator 432 in the cooling side 43, which effectively reduces the layout of lines and can play the function of system fault tolerance. Each fourth fluid branch 431 is provided with a fourth heat exchanger 432, and the heat exchange of the fourth radiator 432 is realized through the fourth water supply pipe 41 and the fourth water return pipe 42 respectively. Each fourth radiator 432 is provided with a fourth exhaust valve AV4, which can avoid a gas collection phenomenon of the fourth radiator 432. At the same time, a fourth exhaust valve AV4 and a fourth drain valve LV4 are respectively provided on the fourth water supply pipe 41 and the fourth water return pipe 42, to facilitate system maintenance and effective exhaust during liquid injection.

Optionally, each fourth fluid branch 431 is respectively provided with two-way shut-off valves DV corresponding to the inlet and the outlet of the fourth radiator 432. By cutting off the fourth radiator 432, it is possible to directly replace and maintain the fourth radiator 432 that cools the generator without draining the liquid. At the same time, before the replacement, the set can be operated with reduced capacity.

Figure 9:
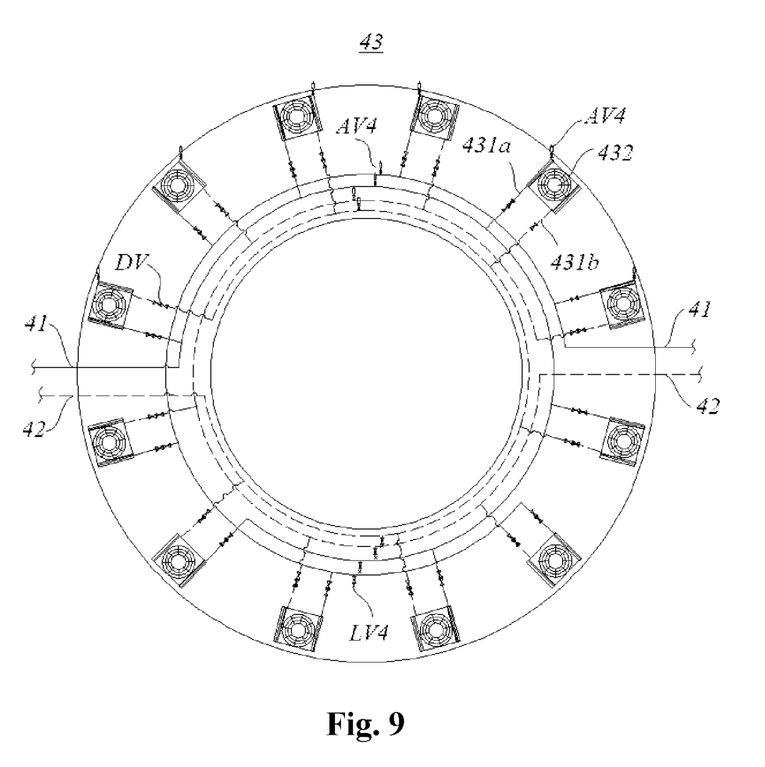
FIG. 9 is a schematic structural diagram of another cooling side in the cooling system shown in FIG. 7.

FIG. 9 shows a schematic structural diagram of another cooling side of the fourth cooling circuit. The cooling side 43 is similar in structure to the cooling side 43 shown in FIG. 8, the difference is that the fourth water supply pipe 41 and the fourth water return pipe 42 of the at least two cooling subsystems S are arranged in a staggered manner relative to the plurality of fourth radiators 432 along the peripheral direction of the cooling side 43.

The fourth water supply pipe 41 and the fourth water return pipe 42 are arranged along the circumferential direction of the cooling side 43. In this arrangement, after the fourth cooling pipe 4 of one cooling subsystem S fails, the heat dissipation of the fourth heating component 400, i.e., the generator, will be more uniform, allowing the unit to operate at higher capacity under fault-tolerant conditions.

Figure 10:
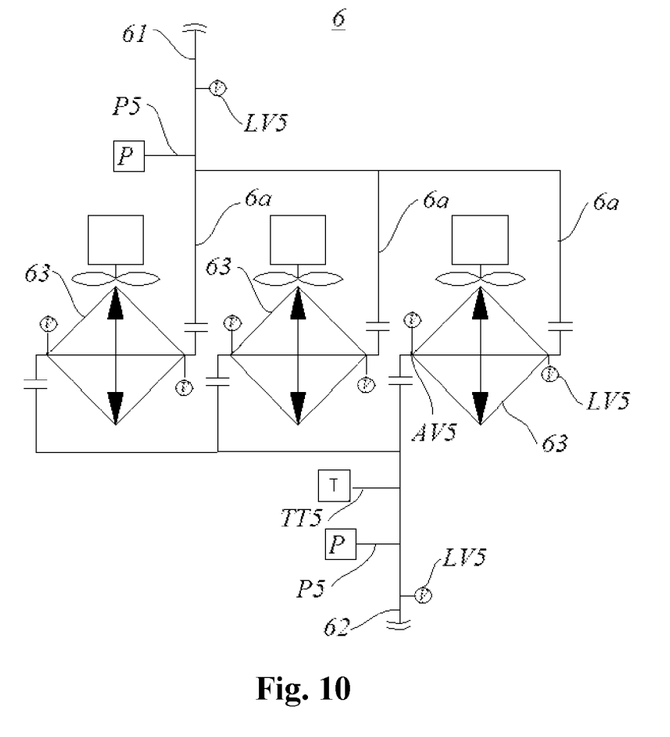
FIG. 10 is a schematic structural diagram of a heat dissipation unit in the cooling system shown in FIG. 1.

Please refer to FIG. 1 and FIG. 10 together, the heat dissipation unit 6 includes a plurality of heat dissipation branches 6a, each heat dissipation branch 6a is provided with a fifth radiator 63, and the fifth water return pipe 62 of the heat dissipation unit 6 is provided with a fifth temperature Sensor TT5. According to the temperature difference between the fifth temperature sensor TT5 and the main temperature sensor TT and a flow rate of the main flow sensor FF, the actual heat dissipation loss of the entire cooling system is obtained.

Optionally, the fifth water supply pipe 61, the fifth water return pipe 62 and at least one of the fifth radiators 63 of the heat dissipation unit 6 are provided with fifth drain valves LV5. Optionally, each fifth radiator 63 is further provided with a fifth exhaust valve AV5. Optionally, the fifth pressure monitoring device P5 includes a pressure transmitter and a pressure display device.

The cooling medium heated up by the first cooling circuit 1, the second cooling circuit 2, the third cooling circuit 3 and the fourth cooling circuit 4 as described above enters the fifth water return pipe 62, and the number of the fifth radiators 63 is based on the system loss amount. The fifth water supply pipe 61 and the fifth water return pipe 62 are arranged in the same way to ensure the uniformity of the flow in each fifth radiator 63. Optionally, fifth pressure monitoring devices P5 are respectively provided on the fifth water supply pipe 61 and the fifth water return pipe 62 for detecting the resistance caused by the heat dissipation unit 6. The fifth water return pipe 62 is provided with a fifth temperature sensor TT5. Combined with the main temperature sensor TT and the main flow sensor FF on the pump station unit 5, the actual heat dissipation and loss of the entire system can be obtained.

The fifth water supply pipe 61, the fifth water return pipe 62 and each fifth radiator 63 of the heat dissipation unit 6 are respectively provided with fifth drain valves LV5. Combined with the main valve V on the pump station unit 5, the first valve V1 on the first water return pipe 12 of the first cooling circuit 1, the fourth valve V4 on the fourth water return pipe 42 of the fourth cooling circuit 4, and the third valve V3 on the third water return pipe 32 of the third cooling circuit 3, the heat dissipation unit 6 can be cut out. The cooling unit 6 is drained through the fifth drain valves LV5 on the fifth water supply pipe 61 and the fifth water return pipe 62.

In addition, the wind power generator set provided by the embodiment of the present disclosure adopts the aforementioned cooling system, and thus has the following beneficial effects: by setting reasonable opening and closing valves and drain valves in each cooling subsystem, it is convenient for the replacement and drainage of local parts of each cooling subsystem, the drainage of the entire system during the replacement and maintenance of parts can be avoided, so as to reduce workload of operation and maintenance. Via a linkage between the opening of the electric valve on each cooling branch and the temperature control of the terminal cooling equipment, and according to the control target of the heating component, the temperature of the terminal equipment is adjusted. Especially in the case of a suitable temperature, by adjusting the flow rate of a coolant in the radiator of the small-capacity heating component, the coolant capacity in the heat exchanger of the large-loss component is increased, and energy saving of the fan of the terminal radiator is realized, or an over-power generation of the unit under suitable temperature boundary conditions is achieved. The system loss and the heat transfer direction during the operation of the set can be effectively recorded, and at the same time, combined with the ambient temperature, a more reasonable part selection can be explored, to provide sufficient statistical basis for subsequent evaluation on the reliability of wind power generator set.

In addition, the cooling system according to the above-described exemplary embodiments may be applied to various electrical equipment requiring cooling, such as but not limited to wind power generator set.

Those skilled in the art should understand that the above-mentioned embodiments are all illustrative and not restrictive. Different technical features appearing in different embodiments can be combined to achieve beneficial effects. Those skilled in the art should be able to understand and implement other variant embodiments of the disclosed embodiments on the basis of studying the drawings, the description and the claims. In the claims, the term "comprising" does not exclude other means or steps; an item is intended to include one/a or more/kinds of items when not modified by a quantifier, and may be interchanged with "one/a or more/kinds of items"; terms "first", "second" are used to designate names and not to indicate any particular order. Any reference signs in the claims should not be construed as limiting the protection scope. The functions of the multiple parts appearing in the claims can be realized by a single hardware or software module. The appearance of certain technical features in different dependent claims does not mean that these technical features cannot be combined to achieve beneficial effects.

The invention claimed is:

1. A cooling system, comprising:
   two or more cooling subsystems which are fluidly separate from each other and thermally coupled to each other, wherein each of the two or more cooling subsystems comprises:
   a first cooling circuit for cooling a set of first heating components;
   a second cooling circuit for cooling a set of second heating components, wherein the set of second heating components are different from the set of first heating components;
   a third cooling circuit for cooling a set of third heating components, wherein the set of third heating components are different from the set of first heating components and the set of second heating components;
   a fourth cooling circuit for cooling a set of fourth heating components, wherein the set of fourth heating components are different from the set of first heating components, the set of second heating components, and the set of third heating components;
   a pump station unit; and
   a heat dissipation unit,
   wherein the first cooling circuit and the fourth cooling circuit are connected in parallel to form a first branch, the second cooling circuit and the third cooling circuit are connected in parallel to form a second branch, and the first branch and the second branch are connected in parallel and are connected with the pump station unit and the heat dissipation unit.

2. The cooling system according to claim 1, wherein a cold amount provided by each of the two or more cooling subsystems alone accounts for more than 75% of a total cold amount provided by the entire cooling system during operation.

3. The cooling system according to claim 1, wherein a heat generation amount of the set of first heating components and a heat generating amount of the set of second heating components are smaller than a heat generation amount of the set of third heating components, and the heat generation amount of the set of third heating components is smaller than a heat generation amount of the set of fourth heating components.

4. The cooling system according to claim 1, wherein:
   the pump station unit comprises a pump group, a main water supply pipe, and a main water return pipe; and
   a cooling medium enters a first branch of the main water supply pipe and a second branch of the main water supply pipe from the pump group via the main water supply pipe, the cooling medium enters the first branch via the first branch of the main water supply pipe, the cooling medium enters the second branch via the second branch of the main water supply pipe, and then passes through the heat dissipation unit and flows back into the pump group via the main water return pipe.

5. The cooling system according to claim 4, wherein:
an inlet of the pump group is provided with a main flow sensor, and an outlet of the pump group is provided with a main temperature sensor; and
each of the inlet and outlet of the pump group is also provided with a main pressure monitoring device.

6. The cooling system according to claim 5, wherein:
a fourth temperature sensor and a fourth flow sensor are provided on the fourth cooling circuit; and
according to a temperature difference between the fourth temperature sensor and the main temperature sensor and a flow rate of the fourth flow sensor, an actual heat dissipation loss of the fourth cooling circuit is obtained.

7. The cooling system according to claim 5, wherein:
the heat dissipation unit comprises a plurality of heat dissipation branches, each of the plurality of heat dissipation branches is provided with a fifth radiator, and the fifth water return pipe of the heat dissipation unit is provided with a fifth temperature sensor; and
according to a temperature difference between the fifth temperature sensor and the main temperature sensor and a flow rate of the main flow sensor, an actual heat dissipation loss of the entire cooling system is obtained.

8. The cooling system according to claim 4, wherein:
the first cooling circuit comprises a first fluid line, and a first water supply pipe of the first fluid line is communicated with the first branch of the main water supply pipe;
the fourth cooling circuit comprises a fourth fluid line, a fourth water supply pipe of the fourth fluid line is communicated with the first branch of the main water supply pipe, and a fourth water return pipe of the fourth fluid line is communicated with a first water return pipe of the first cooling circuit; and
the fourth water return pipe of the fourth cooling circuit enters the heat dissipation unit and then is communicated with the main water return pipe.

9. The cooling system according to claim 8, wherein:
the set of first heating components comprises at least two first heating components:
the first fluid line comprises at least two first fluid branches corresponding to the at least two first heating components one-to-one; and
for each of the at least two first fluid branches,
the corresponding first fluid branch is provided with a first branch radiator, a first branch regulating valve, a first branch temperature sensor, and a first branch flow sensor, with the first branch regulating valve, the first branch temperature sensor, and the first branch flow sensor located at a downstream of the corresponding first fluid branch; and
measured values of the first branch temperature sensor and the first branch flow sensor are monitored, and according to a target temperature value of a respective first heating component associated with the corresponding first fluid branch, an opening of the first branch regulating valve is controlled to adjust a flow rate of the corresponding first fluid branch.

10. The cooling system according to claim 9, wherein an inlet and an outlet of the first branch radiator are provided with a first pressure monitoring device, respectively.

11. The cooling system according to claim 8, wherein:
the fourth fluid line is provided with a cooling side located on a peripheral side of the set of fourth heating components, the cooling side comprises a plurality of fourth fluid branches arranged in parallel, with a respective fourth radiator being arranged on each of the plurality of fourth fluid branches such that a plurality of fourth radiators are evenly distributed along a peripheral direction of the cooling side; and
fourth water supply pipes and fourth water return pipes of the two or more cooling subsystems are arranged side by side relative to each of the plurality of fourth radiators in the cooling side; or, the fourth water supply pipes and the fourth water return pipes of the two or more cooling subsystems are arranged in a staggered manner relative to the plurality of fourth radiators along the peripheral direction of the cooling side.

12. The cooling system according to claim 11, wherein each of the plurality of fourth fluid branches is provided with two-way-shut-off valves corresponding to an inlet and an outlet of the respective fourth radiator, respectively.

13. The cooling system according to claim 8, wherein each of the fourth water supply pipe and the fourth water return pipe is provided with a fourth pressure monitoring device.

14. The cooling system according to claim 4, wherein:
the second cooling circuit comprises a second fluid line, and a second water supply pipe of the second fluid line is communicated with the second branch of the main water supply pipe;
the third cooling circuit comprises a third fluid line, a third water supply pipe of the third fluid line is communicated with the second branch of the main water supply pipe, and a third water return pipe of the third fluid line is communicated with a second water return pipe of the second fluid line; and
the third water return pipe of the third cooling circuit enters the heat dissipation unit and then is communicated with the main water return pipe.

15. The cooling system according to claim 14, wherein:
the set of second heating components comprises a second heating component;
the second fluid line is provided with a second radiator, and the second water return pipe is provided with a second regulating valve, a second temperature sensor, and a second flow sensor; and
measured values of the second temperature sensor and the second flow sensor are monitored, and according to a target temperature value of the second heating component, an opening of the second regulating valve is controlled to adjust a flow rate of the second fluid line.

16. The cooling system according to claim 14, wherein each of the second water supply pipe and the second water return pipe is provided with a second pressure monitoring device.

17. The cooling system according to claim 14, wherein:
the set of third heating components comprises at least two third heating components;
the third fluid line comprises at least two third fluid branches corresponding to the at least two third heating components one-to-one, and the at least two third fluid branches are integrated into a valve block unit; and
for each of the at least two third fluid branches, the corresponding third fluid branch is provided a third branch radiator, a third branch regulating valve, a third branch temperature sensor, and a third branch flow sensor, with the third branch regulating valve, the third branch temperature sensor, and the third branch flow sensor located at a downstream of the corresponding third fluid branch; and measured values of the third branch temperature sensor and the third branch flow sensor are monitored, and according to a target temperature value of a respective third heating component associated with the corresponding third fluid branch, an opening of the third branch regulating valve is controlled to adjust a flow rate of the corresponding third fluid branch.

18. The cooling system according to claim 17, wherein at least a third fluid branch from the at least two third fluid branches is provided with a heater and an additional temperature sensor integrated into the valve block unit, the additional temperature sensor is used to measure an inlet temperature of at least the third fluid branch, and if the inlet temperature is lower than a preset temperature, the heater is activated.

19. The cooling system according to claim 17, wherein the valve block unit and a downstream of each of the at least two third fluid branches are provided with a respective third pressure monitoring device.

20. A wind power generator set, comprising:
a first heating component comprising at least one of a bearing or a pitch mechanism;
a second heating component comprising at least one of a nacelle or a nacelle cabinet;
a third heating component comprising at least one of a converter or a transformer;
a fourth heating component comprising a generator; and
a cooling system, comprising two or more cooling subsystems thermally coupled to each other, wherein each of the two or more cooling subsystems comprises:
a first cooling circuit for cooling the first heating component;
a second cooling circuit for cooling the second heating component;
a third cooling circuit for cooling the third heating component;
a fourth cooling circuit for cooling a fourth heating component;
a pump station unit; and
a heat dissipation unit,
wherein the first cooling circuit and the fourth cooling circuit are connected in parallel to form a first branch, the second cooling circuit and the third cooling circuit are connected in parallel to form a second branch, and the first branch and the second branch are connected in parallel and are connected with the pump station unit and the heat dissipation unit.

* * * * *